Figure 1:
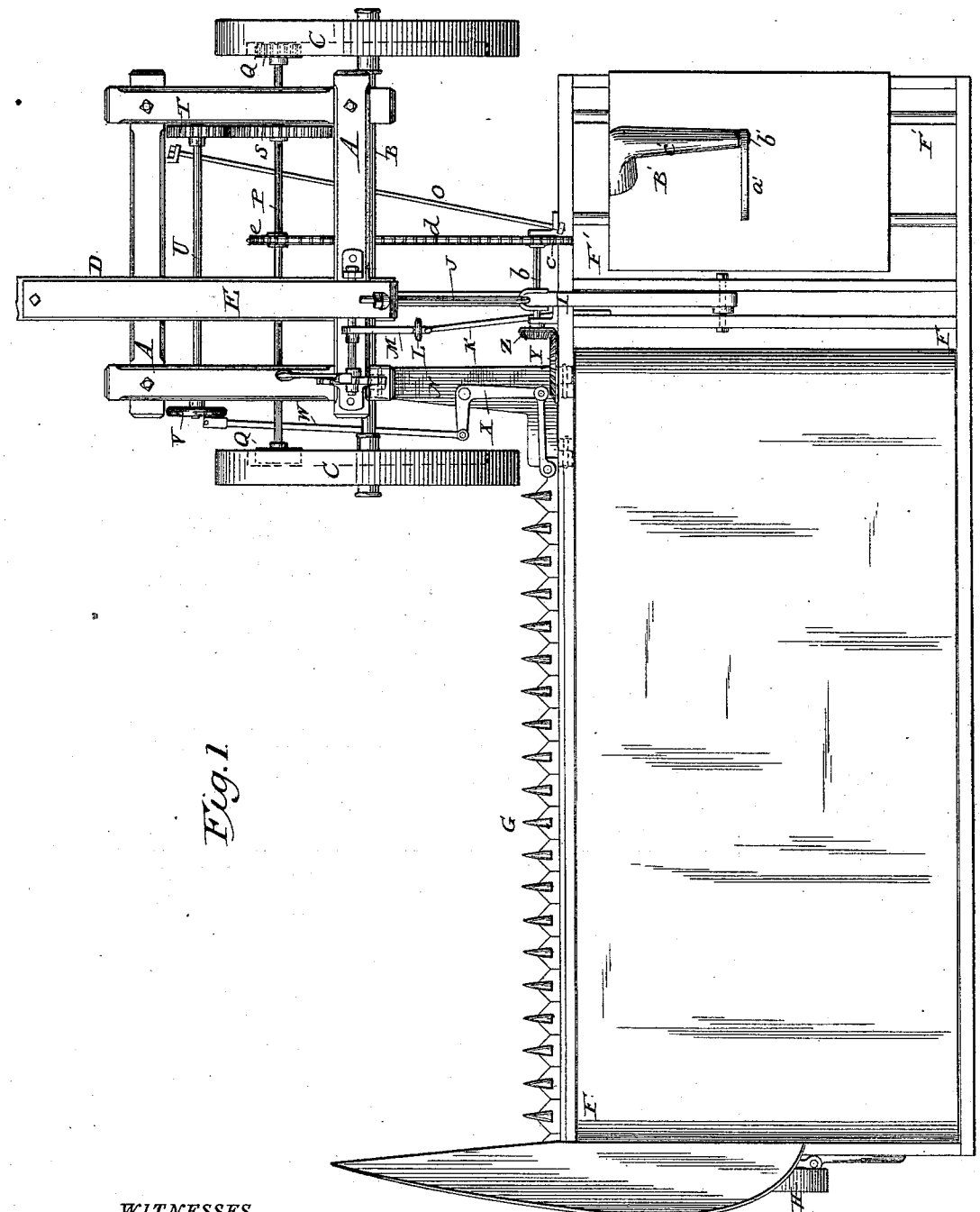

(No Model.) 2 Sheets—Sheet 2.

J. KNOOP.
GRAIN HARVESTING AND BINDING MACHINE.

No. 347,617. Patented Aug. 17, 1886.

WITNESSES
Sidney P. Hollingsworth
William H. Shipley

INVENTOR
Josiah Knoop
By P. T. Dodge
Attorney

UNITED STATES PATENT OFFICE.

JOSIAH KNOOP, OF CASSTOWN, OHIO.

GRAIN HARVESTING AND BINDING MACHINE.

SPECIFICATION forming part of Letters Patent No. 347,617, dated August 17, 1886.

Application filed January 8, 1885. Serial No. 152,352. (No model.)

*To all whom it may concern:*

Be it known that I, JOSIAH KNOOP, of Casstown, in the county Miami and State of Ohio, have invented certain Improvements in Grain Harvesting and Binding Machines, of which the following is a specification.

This invention has reference to improvements upon the machine for which Letters Patent of the United States were issued to me on the 15th day of April, 1884, No. 296,843.

The improvements consist in the manner of connecting the platform with the main frame, in the arrangement of gear for imparting motion to the cutter and the endless conveyer and other details of minor importance.

In the drawings I have represented a machine adapted for the application of self-binding mechanism thereto. The binding may be omitted and hand-binding or drop mechanisms substituted therefor.

Figure 2:
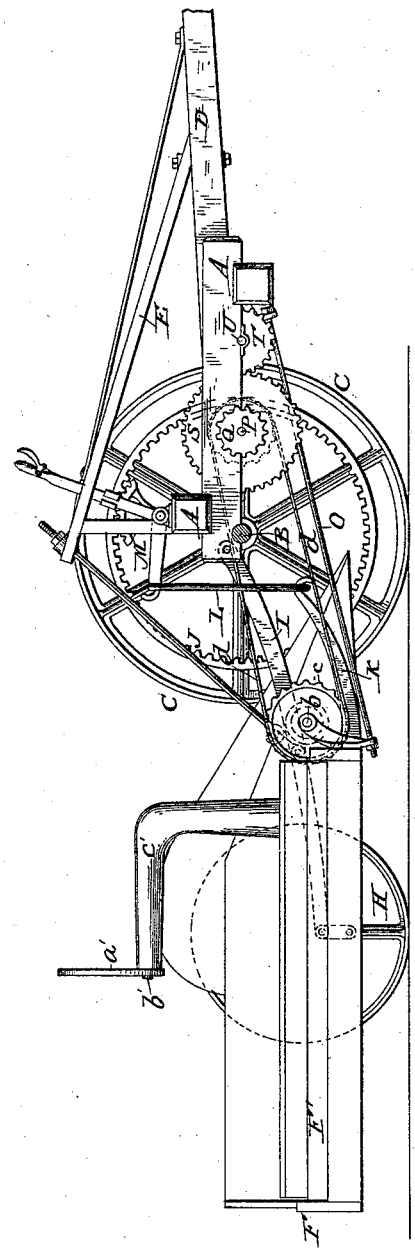
Figure 4:
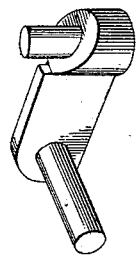
Figure 3:
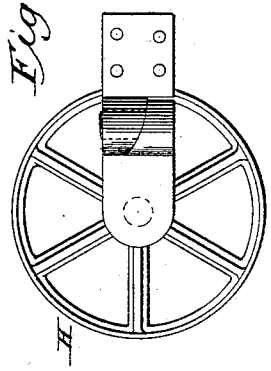

Referring to the drawings, Figure 1 represents a top plan view of the machine; Fig. 2, an elevation of the same viewed from the stubble side, one of the main wheels being removed for the purpose of exposing other parts to view. Figs. 3 and 4 are details illustrating the connection of the carrying-wheel to the main frame at the grain side of the machine.

Referring to the accompanying drawings, A represents the rigid main frame constructed of rectangular form and mounted in a horizontal position on the main axle B, the ends of which are extended beyond the main frame and carried in two ground-wheels, C, which will be connected therewith by the usual clutch or pawl-and-ratchet mechanisms for the purpose of imparting motion thereto. The frame is provided with a draft-pole, D, attached rigidly thereto, and is also provided with an elevated arm, E, located near the outer or grain side, and terminating at a point substantially over the sickle. This arm may be constructed in the form of a bar extending lengthwise of the frame and supported at the rear end by a standard thereunder, as shown in Fig. 2, or it may be otherwise constructed, the only requirement being that it shall afford a rigid support rising from the rear end of the main frame to receive the platform-sustaining device hereinafter described.

F represents the rigid platform constructed of an oblong rectangular form. It is provided at the forward edge with the usual cutting apparatus, G, and is prolonged or extended inward at the stubble side beyond the cutting apparatus and in rear of the main frame to form a secondary platform or grain-receiving table, F'.

In the rear of the cutting apparatus I mount an endless apron, endless toothed chains, or any equivalent conveying mechanism known in the art for the purpose of delivering the grain from the receiving portion of the platform to the secondary platform or table, F', on which it will be bound or from which it will be delivered in gavels if a dropping mechanism be employed. When the endless apron or endless chains are employed, I mount the same, as usual, upon horizontal supporting-rolls located at the two ends and seated in the platform-frame. The outer or grain end of the platform-frame is carried by a ground-wheel, H, while its inner end is sustained and carried by an arm, I, the forward end of which is jointed to the main frame, and the rear end is jointed to the platform-frame, the connection being made by means of a link, as represented in Fig. 2, or in any other appropriate manner, the only requirement being that the connection shall permit the platform-frame to tilt forward and backward, as required, in order to effect the elevation and depression of the cutters. It will be observed that the supporting-arm I is connected to the platform-frame at such point between the front and rear edges as to secure a proper balance of the frame, so that it may be readily tilted or adjusted. It is preferred to connect the sustaining-arm with the platform-frame at a point between the main or receiving platform and the secondary platform, F', so that when the binding apparatus is applied to the secondary platform it will to an extent counterbalance the weight of the receiving-platform, and thus transfer an increased portion of the weight to the main frame and wheels, the effect being to permit the small wheel at the grain side to travel more readily over uneven surfaces, and also to increase the traction of the main wheels C, so that the mechanism may be operated with certainty.

It is to be particularly noted that in my machine the entire weight of the inner end of the platform-frame and of the binding mechanism, when it is in place thereon, is carried by the arm I directly from the main frame at a point midway between the main wheels. In this respect my machine differs materially from those in which the weight is carried, as shown in Letters Patent of Wilson, No. 250,620, by two arms extending rearward from opposite sides of the main frame. The sustaining-arm I is in turn sustained by means of a rod, bar, or chain, J, the lower end of which is connected to the arm I midway of its length, while the upper end is attached to the before-mentioned arm or standard E at the rear end of the main frame. The rod J may be extended through the arm E and secured by a nut at the upper end, as represented in Figs. 1 and 2, to admit of the platform-frame being raised and lowered; or in place of the nut a screw, a rack and pinion, or any of the equivalent adjusting devices familiar to those skilled in the art may be used.

For the purpose of controlling the forward and backward inclination of the platform and changing the height of the cut, as circumstances may demand, I secure to the forward edge of the platform in rear of the main frame a rigid arm, K, and connect the forward end of this arm by a link, L, to the lower extremity of a hand-lever, M, which is mounted on the main frame in such position as to be conveniently manipulated by the driver. This lever will be combined with locking devices of any suitable character by which it may be held in position. I have represented for the purpose a fixed rack-plate, and a dog upon the lever to engage therewith.

For the purpose of drawing the platform-frame, I employ a draw-bar, N, jointed at its forward end to the main frame at or near the crank-shaft and jointed at the rear end to the forward edge of the platform-frame near the inner or heel end of the cutting apparatus. As a further means of maintaining a proper relation between the platform-frame and main frame, I employ a brace-rod, O, extending from the forward edge of the secondary platform, F', diagonally to the forward stubble-corner of the main frame, as plainly represented in Figs. 1 and 2.

Motion is imparted to the reciprocating sickle in the following manner: A shaft, P, is mounted transversely of the main frame in bearings thereon and provided at its two ends with pinions Q, which engage gear-teeth or gear-wheels on the inner sides of the main ground-wheels C. The shaft P carries a large spur-wheel, S, which in turn actuates a pinion, T, on a second transverse shaft, U. At the outer end this shaft carries a crank-wheel, V, which is connected by a pitman, W, to an elbow-lever, X, which latter is pivoted on the draw-bar N and connected at its opposite end directly or indirectly to the sickle.

For the purpose of communicating motion to the endless conveyer, I provide the carrying-roll at its inner end with a beveled gear, Y, which is driven by a pinion, Z, on one end of a shaft, b, which is mounted in bearings on the forward edge of the platform-frame. This shaft b carries a sprocket-wheel, c, connected by a chain, d, with a sprocket-wheel, e, on the main gear-shaft P, before alluded to. This connection imparts a constant motion to the conveyer-apron, and permits the platform-frame to rise and fall to the extent demanded in practice without interference therefrom.

As before mentioned, I propose to place on the secondary platform or binding-table an automatic binding mechanism. This mechanism may be of the Appleby, Gordon, Wood, or other known type, or of any special form desired.

In the drawings I have represented the binder-frame B' arranged on ways or guides extending in a fore and aft direction, so that it may be moved forward and backward in a direction at right angles to the cutter-bar, in order to place the band in the middle of grain of different lengths. It will be perceived that my construction permits the binder-frame to extend forward between the two main wheels, so that the platform-frame may be placed in close proximity to the main frame. This is considered an important feature, since it permits the machine to be placed in compact form and to be readily balanced on the main wheels.

In the drawings, a' represents the binder-arm, carried by a shaft, b', in a standard or bracket, c', which rises from the bars of the binder-frame and overhangs the binding-table, as in other machines. The grain delivered from the receiving-platform to the binding-table will have the cord laid about it by the binder-arm in a plane parallel with the length of the cutter-bar.

The band-fastening devices may be of ordinary form, and, if desired, packing and compressing mechanisms may be used to compact and hold the gavel. To these devices and the devices for imparting motion to the binder I lay no claim herein.

It is to be noted that in the present machine the main frame and gearing are located almost wholly in front of the main axle, in order to counterbalance the weight of the platform-frame and binder. If necessary, an additional weight may be applied to the front of the main frame or draft-pole.

When two wheels are employed in connection with platform-sustaining devices located between them, as in the present machine, the platform receives a vertical motion less than that of either of the wheels as the latter pass one at a time over obstructions or through depressions. In this respect the machine is far superior to that represented in my original patent, in which the frame suspended directly in rear of a single wheel received a vertical movement greater than that of the wheel. The two-wheeled machine runs more easily and with less vibration than the other.

Grain-wheels are commonly connected with harvester-frames by horizontally-swinging arms. These arms are usually of a length greater than the diameter of the wheel, and the parts are so constructed that the machine is free to play laterally without hinderance.

Instead of constructing the arm in the usual manner, I reduce its length to such extent that its hinge or pivotal point will fall within the periphery of the wheel, and instead of constructing the hinge-joint in the usual manner I provide the arm and the plate to which it is jointed with inclined bearing-surfaces, as shown in Figs. 3 and 4, so that the wheel in turning is compelled to lift the frame. In this manner the weight of the frame is applied so that it tends to resist the swinging motion of the arm, whereby the wheel is caused to resist the lateral play of the frame. It is found that when the parts are thus constructed the machine will run more steadily than when constructed in the ordinary manner.

Having thus described my invention, what I claim is—

1. In a grain-harvesting machine, the main frame provided with two sustaining-wheels at its sides and with a rearwardly-extended rigidly-supported arm I, located midway between the wheels, in combination with the platform-frame having its stubble end jointed to and sustained wholly by said arm.

2. The two-wheeled main frame provided with the rigidly-supported rearwardly-extending arm I midway between the wheels, in combination with the platform-frame jointed to and sustained wholly by said arm, and the binding mechanism located on the platform-frame on the opposite side of the arm from the cutting mechanism, whereby the weight of the binder is applied to counterbalance in part the weight of the cutting and conveying mechanisms, so that the weight of both is transmitted through the arm I to the main frame.

3. The main frame provided with the carrier-wheels and with the depressed rearwardly-extending arm I and its support J between said wheels, in combination with the platform-frame prolonged in rear of the wheels and jointed to and sustained by the arm J, the draw-bar N, jointed to the two frames, and the lever M, mounted on the main frame and connected with the platform-frame to effect its tilting movement.

4. The main frame provided with two sustaining-wheels at its side and with the arm I extended rearward and rigidly supported from said frame midway between said wheels, in combination with the platform-frame jointed at an intermediate point in its length to said arm and sustained thereby, and the binding mechanism located on the platform-frame on the stubble side of the arm and adjustable forward and backward thereon.

5. The frame and the grain-wheel, in combination with the hinged wheel-carrying arm provided with the inclined surface, as described, to resist lateral motion of the frame.

In testimony whereof I hereunto set my hand, this 4th day of October, 1884, in the presence of two attesting witnesses.

JOSIAH KNOOP.

Witnesses:
CHARLES McGALLIARD,
LILLIE McDOWELL.